Sept. 9, 1947.  A. E. FORSSELL  2,427,269
DUAL ACCELERATOR CONTROL
Filed March 4, 1946
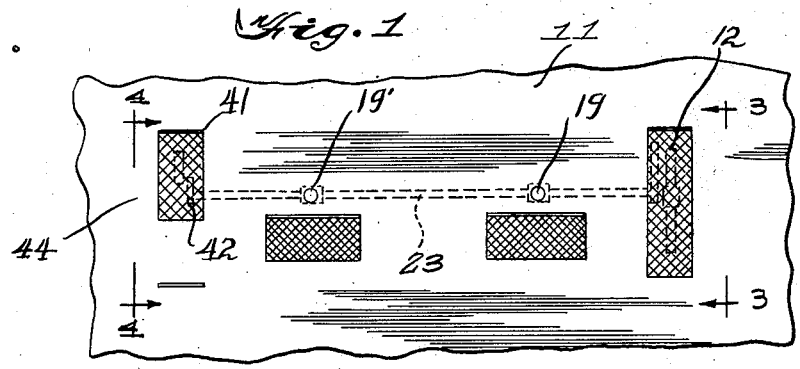
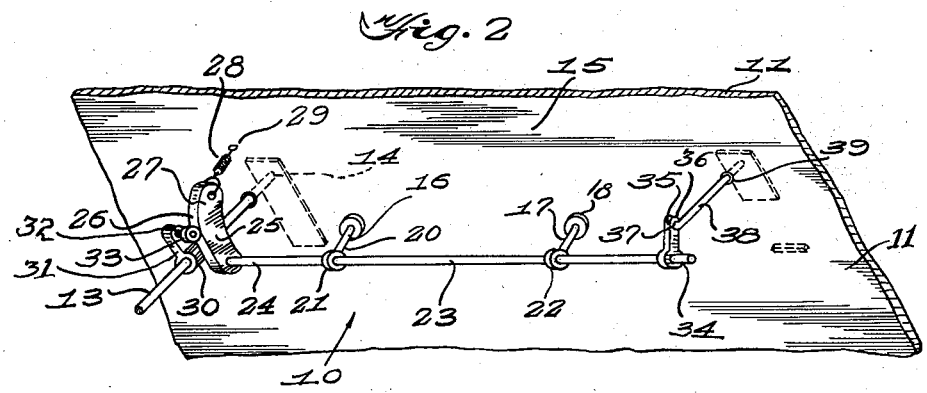
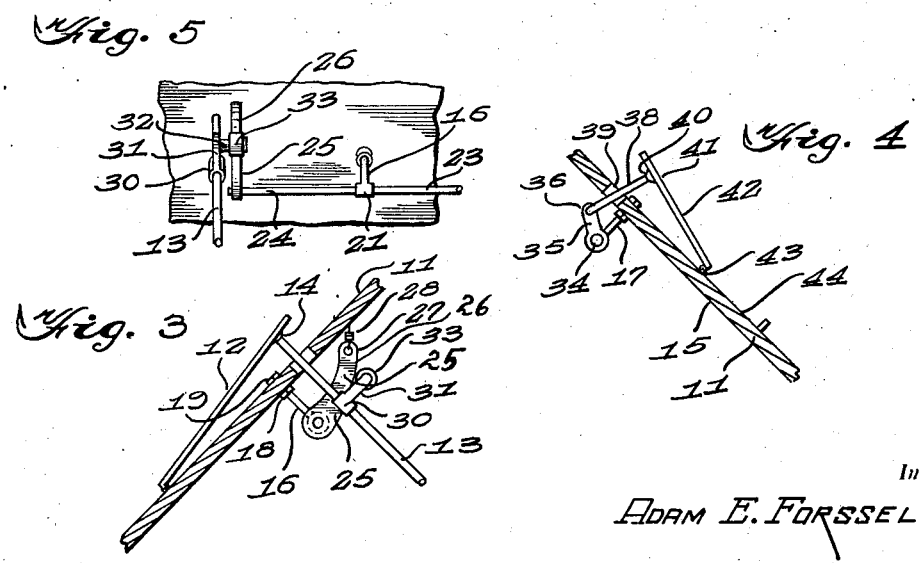
Inventor
ADAM E. FORSSELL
By Clarence A. O'Brien
and Harvey B. Jacobson
Attorneys

Patented Sept. 9, 1947

2,427,269

UNITED STATES PATENT OFFICE 2,427,269

DUAL ACCELERATOR CONTROL

Adam E. Forssell, Seattle, Wash.

Application March 4, 1946, Serial No. 651,804

1 Claim. (Cl. 74—513)

The invention as described herein, and illustrated in the accompanying drawings, consists of a right and left foot accelerator control, an object of which is to provide means for making driving a motor vehicle more comfortable and pleasant by relieving the right foot when desired from accelerator control.

Another object of the invention is to provide means whereby the accelerator of an automobile may be operated by either the right or left foot or both feet if desired.

Another object of the invention is to provide a rest for the left foot of a motor vehicle driver which rest is also adapted to actuate an accelerator.

Other features and advantages will become more readily apparent from the following description and the accompanying illustrative drawings in which:

Figure 1 is a plan view of the floor board of an automobile,

Figure 2 is a perspective view from the underside thereof,

Figure 3 is a sectional view taken on line 3—3 of Figure 1,

Figure 4 is a similar view taken from line 4—4 of Figure 1, and

Figure 5 is a bottom plan view of Figure 3.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout and in which 10 refers to the invention in its entirety and 11 indicates the floor board of a motor vehicle, 12 is the common accelerator pedal, 13 is the carburetor lever operating rod the head 14 of which is born upon by said pedal 12. The above are all common elements of any automobile. However in addition to the above elements there is provided depending from the underside 15 of the floor board 11 rods 16 and 17, the upper ends of which are secured to said board by nuts 18 and 19 screwed upon said ends one on each side of the board 11. On the lower ends 20 of said rods are fixed bearings 21 and 22 for supporting reciprocatingly therein a longitudinal shaft 23.

To the end 24 of said rod 23 is fixed a lever 25 having an arcuate lower edge 26 and to the free end 27 of which is attached one end of a coil spring 28 the other end of which is attached to an eye 29 fixed to said floor board 11, whereby the lever is normally held raised. Fixed to rod 13 is a collar 30 from which extends an arm 31 having a right-angular pin 32 extending inwardly and in the path of the lever 25. Rotatably mounted upon the pin 32 is a lubricated steel roller 33 which constantly bears upon the arcuate surface 26 of the lever 25 through the action of the accelerator rod 13.

To the end 34 of shaft 23 is fixed a lever 35 to the free end 36 of which is pivoted the right-angular end 37 of a push rod 38 which operates through a bore 39, in said board 11, and adjacent to where the left foot of a driver would be located when driving but out of the way of the clutch and brake pedals. The inner end 40 of rod 38 is fixed to the under surface of the upper end 41 of a left foot pedal 42 hinged at 43 to the inner side 44 of said board 11.

From the above described very simple arrangement a driver may relieve his right foot from its accelerator operation whenever he wishes to change to his left foot, as pressure upon pedal 42 will push rod 38 down and operate lever 35 to actuate shaft 23 which in turn will actuate lever 25 causing its edge 26 to ride roller 33 causing it to press down accelerator rod 13 through the pin 32 and arm 31 and thus the left foot may control the flow of gas as well as the right foot.

From the foregoing specification it will become apparent that the invention disclosed will adequately accomplish the functions for which it has been designed and in an economical manner and that its simplicity, accuracy and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to in actual practice, if desired.

Having now described the invention that which is claimed to be new and desired to be procured by Letters Patent is:

In combination with a motor vehicle having an internal combustion engine and a floor board, of a carburetor control lever operating rod reciprocably mounted through said floor board terminating in an enlarged bearing head, an accelerator pedal hinged upon the upper surface of said floor board engageable with said bearing head, an auxiliary operating rod reciprocably mounted through said floor board laterally of said carburetor control lever having its lower end bent at right angles, a foot pedal supported on the upper end thereof, spaced bearings secured to the under surface of said floor board between said carburetor control lever and auxiliary operating rod, a shaft rotatably mounted in said bearings, a lever fixed to said shaft having an arcuate lower bearing surface, resilient means connected between said lever and the floor board, a collar secured to said carburetor control lever operating rod terminating in an outwardly projecting arm, a roller disposed upon said arm engageable with the arcuate surface of said lever, and a link secured to the opposite end of said shaft being apertured at its outer end for receiving the right angularly bent lower end of said auxiliary operating rod, whereby either pedal will operate said carburetor control lever operating rod.

ADAM E. FORSSELL.

REFERENCES CITED

The following references are of record in the file of this patent:

UNITED STATES PATENTS

| Number | Name | Date |
| --- | --- | --- |
| 2,226,569 | Martin | Dec. 31, 1940 |
| 1,941,516 | Sweet | Jan. 2, 1934 |
| 1,261,425 | Murphy | Apr. 2, 1918 |